United States Patent [19]

Mueller et al.

[11] Patent Number: 5,447,441

[45] Date of Patent: Sep. 5, 1995

[54] CONNECTOR BOX FOR SHIELDED CABLES

[75] Inventors: Karl Mueller, Donaueschingen; Dieter Jaag, Villingen-Schwenningen, both of Germany

[73] Assignee: BTR Blumberger Telefon–und Relaisbau Albert Metz, Germany

[21] Appl. No.: 135,191

[22] Filed: Oct. 12, 1993

[30] Foreign Application Priority Data

Oct. 13, 1992 [DE] Germany .................. 42 34 451.4
Mar. 20, 1993 [DE] Germany .................. 43 09 039.7

[51] Int. Cl.6 .................................................. H01R 9/09
[52] U.S. Cl. .................................. 439/76.1; 439/607
[58] Field of Search ............... 439/76, 98, 607, 676, 439/535, 536

[56] References Cited

U.S. PATENT DOCUMENTS

| | | | |
|---|---|---|---|
| 2,968,689 | 1/1961 | Johnson | 174/48 |
| 4,732,568 | 3/1988 | Hall | 439/676 |
| 4,756,695 | 7/1988 | Lane et al. | 439/76 |
| 4,886,464 | 12/1989 | Zetena, Jr. | 439/98 |
| 4,902,242 | 2/1990 | Davis et al. | 439/607 |
| 5,037,313 | 8/1991 | Linden et al. | 439/76 |
| 5,037,331 | 8/1991 | Goodman et al. | 439/607 |
| 5,167,531 | 12/1992 | Broschard, III et al. | 439/607 |
| 5,207,597 | 5/1993 | Kline et al. | 439/607 |
| 5,281,169 | 1/1994 | Kiat et al. | 439/607 |

FOREIGN PATENT DOCUMENTS 127846 11/1990 Germany ................. H02G 3/16

Primary Examiner—Mark Rosenbaum
Assistant Examiner—Chuck Y. Mah
Attorney, Agent, or Firm—Eugene E. Renz, Jr.

[57] ABSTRACT

Connector box for shielded cables comprising upper and lower base parts and a printed board held between the upper and lower base parts. There is at least one jack and a terminal connector mounted on the printed board are conductively connected to each other by way of the printed board. The connector box is characterized in that the lower base part and upper base part form a housing and are die cast metal parts, and wherein the upper base part is seated by its peripheral edge on the lower base part in an electrically conductive manner. The housing encloses and shields at least the jack and a portion of the printed board. A structure is provided for holding the shielding of a cable on one of the base parts in electrically conductive contact therewith.

15 Claims, 16 Drawing Sheets

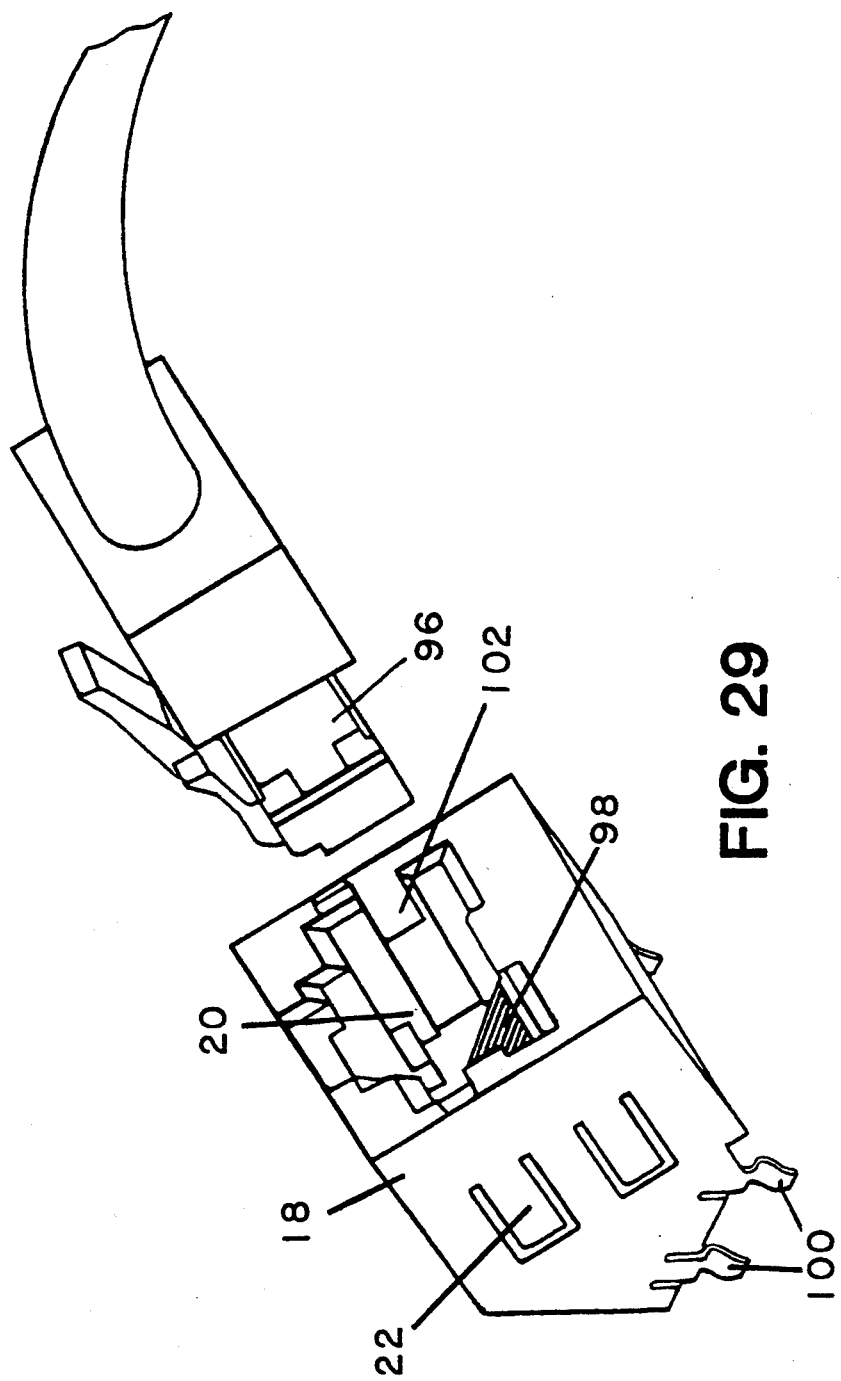

5,447,441

CONNECTOR BOX FOR SHIELDED CABLES

FIELD OF THE INVENTION

The present invention relates to a connector box for shielded cables, specifically, data transmission cables.

BACKGROUND OF THE INVENTION

In data transmission systems such as digital communications systems, net-worked computer systems and the like, efforts are being made increasingly to design the terminal devices so that they can be connected to the system by plugging them into connector boxes. The interruption of the data transmission cable represented by plug connection to a connector box means a considerable increase in the characteristic impedance, so that, especially at high transmission rates and thus in the presence of high frequencies, large attenuation losses occur.

Before a data transmission cable can be connected to the jack of the connector box, the shielding around the cable must be removed. As a result, the data line can pick up interference and at high transfer frequencies, it actually functions as an antenna which sends out unwanted signals.

SUMMARY OF THE INVENTION

With the foregoing in mind, an object the present invention is to provide a connector box for shielded cables which is particularly suited for data transmission system and which makes it possible to transmit interference-free signals even at high frequencies. To this end, the present invention provides a connector box having an enclosed housing made of die-cast metal. The housing encloses, and thus shields, all parts of the connector box in which the leads of the cable are freely exposed. This prevents unwanted signals from being picked up and transmitted. The shielding of the cables connected to the connector is guided with good electrical contact to the jack by way of the conductive housing, so that continuous shielding means that the characteristic impedance of the plug connection is low, and thus data transfers can be accomplished with little attenuation even at high transfer rates or high frequencies.

To obtain optimum enclosure, the housing consists of a lower base part and an upper base part of die-cast metal, preferably die cast zinc. These two base parts are screwed tightly together. Fastening the two parts of the base together by means of self-tapping screws results in a high contact pressure between the lower and upper parts of the base and results in an additional conductive connection by way of the screws results in a high contact pressure between the lower and upper parts of the base. This produces an additional conductive connection by way of the screws. The upper and lower parts of the base engage with each other over their entire periphery, so that there is no continuous open butt joint between the upper and lower part of the base, through which unwanted signals could be transmitted.

The terminal for the cable to be connected is situated outside the enclosure formed by the upper and lower parts of the base and is thus readily accessible so that the upper and lower parts of the base do not have to be separated during the installation of the connector box. The terminal is shielded by a discrete conductive cover.

To guide the shielding from the connected cable to the jack with minimum ohmic resistance, the shielding of the cable is held under pressure against the conductive housing. The housing for its part is also held under pressure against the conductive lamination of the printed board, preferably with the help of additional contact points. The shielding of the jack is soldered in turn to the printed board.

The connector box can be designed either as a surface-mounted box or as a flush-mounted box. In the design as a flush-mounted box, the housing is provided with an installation ring, which can be made of plastic, to prevent interference from being picked up from the building wall.

BRIEF DESCRIPTION OF THE DRAWINGS

These and other objects of the present invention and the various features and details of the operation and construction thereof are hereinafter more fully set forth with reference to the accompanying drawings, wherein:

FIG. 29 shows a perspective view of the connector box jack;

DETAILED DESCRIPTION OF THE PREFERRED EMBODIMENT

Figure 2:
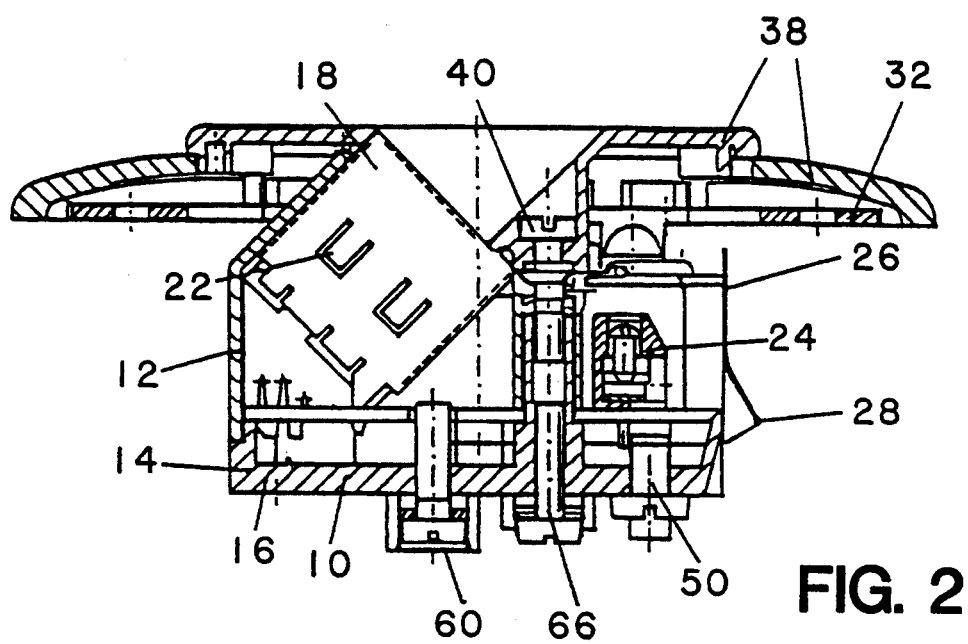
FIG. 2 shows a cross section through lines II—II of FIG. 1.
Figure 1:
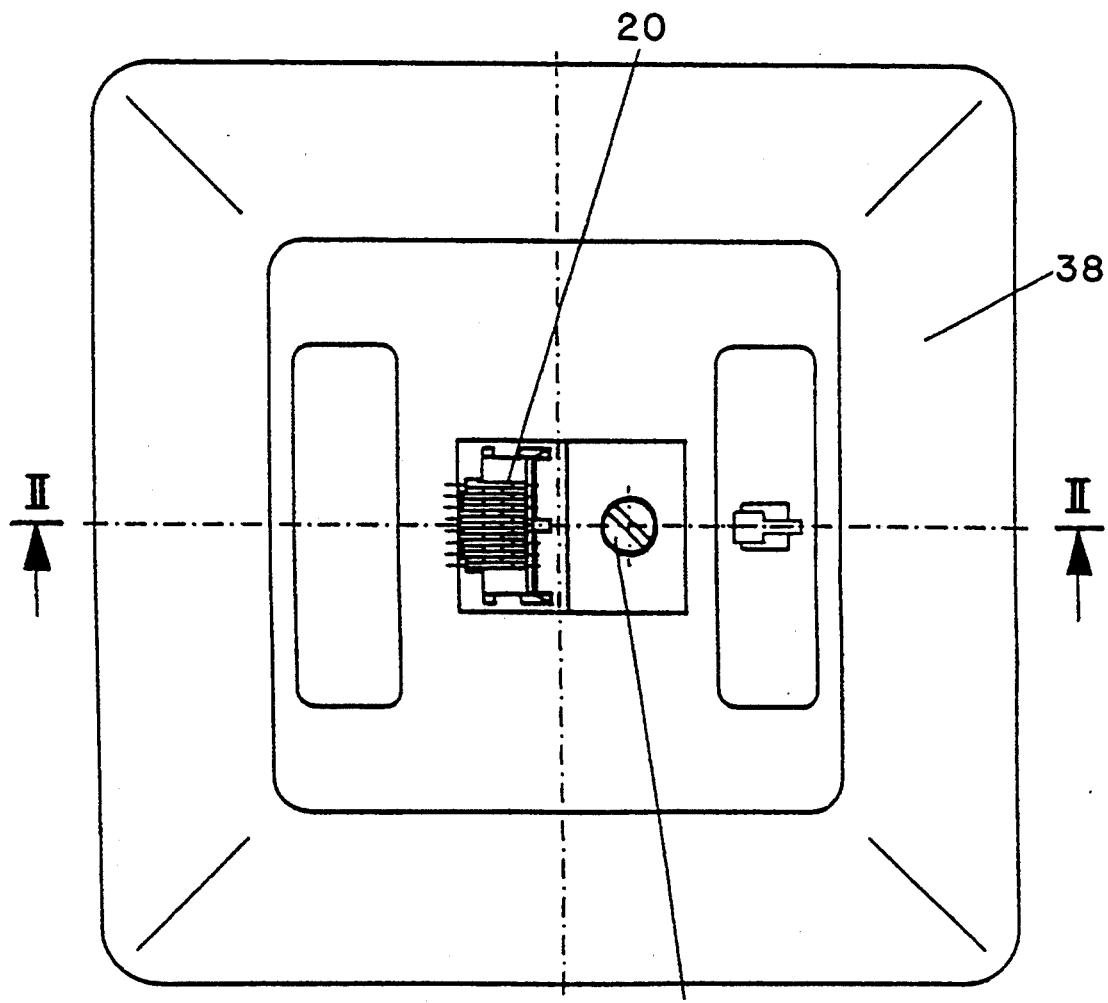
FIG. 1 shows a top view of the connector box with its protective cap in place.
Figure 3:
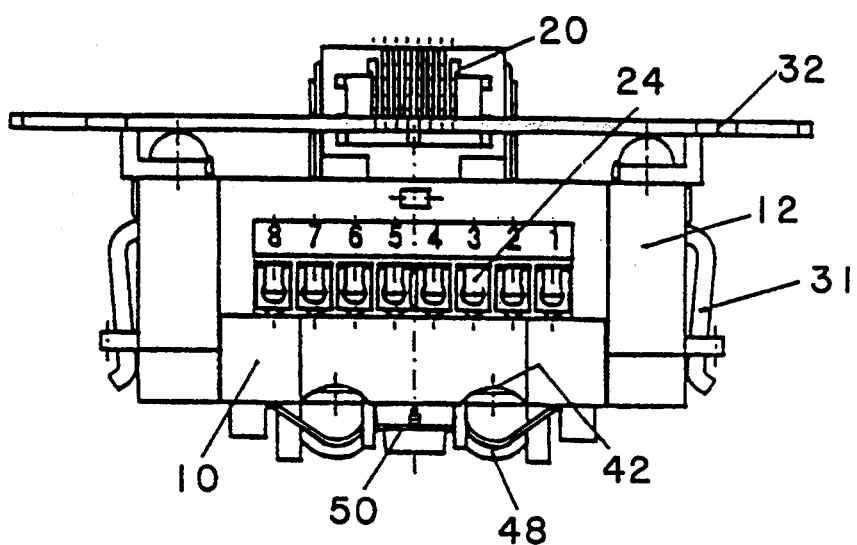
FIG. 3 shows a side view of the box in FIG. 1, from the right without the protective cap.

Referring now to the drawings and particularly to FIGS. 1-7 thereof, there is illustrated an exemplary embodiment of a connector box in accordance with the present invention. The connector box generally designated $B_c$ comprises a bottom base part 10 and an upper base part 12 preferably made of a die-cast zinc.

Bottom part 10 of the base has essentially the form of a plate with an upwardly projecting rim 14 around its periphery. Upper base part 12 encloses a receptacle space and is seated on rim 14 of lower base part 10. Rim 14 has shoulders, as can be seen most clearly in FIG. 16, so that upper base part 12 is able to grip around rim 14. Thus, the gap between the base parts is stepped and thus, a straightly passing through butt joint gap between the lower base part and upper base part is avoided/is not formed. The lower base part 10 and upper base part 12, thus, form a closed, metallic housing, the interior space of which is shielded against electrical field.

A printed board 16 is seated on lower base part 10. This printed board is parallel to the plane of lower base part 10 and is held between lower base part 10 and upper base part 12, as can be seen in the detailed view in FIG. 16. On printed board 16, a receptacle 18, formed from a piece of stamped sheet metal, is provided, into which a jack 20, which accepts a data cable plug 96, is inserted. Jack 20 is designed to accept the plugs of the connection system in question. In the exemplary embodiment illustrated jack 20 is designed as a Western jack. The jack of a subminiature plug connection can also be used. Receptacle 18 with jack 20 is located in its entirety inside the closed, shielded housing formed by lower base part 10 and upper base part 12.

FIG. 29 shows a perspective view of receptacle 18 for jack 20. Jack 20 is a plastic part with a plug-in opening. The cross section of this opening matches the cross section of plug 96. Springy contacts 98 are provided in the plug-in opening. Receptacle 18 is bent out of a thin sheet of metal and encloses jack 20 on all four sides as well as the end with the plug-in opening, which it encircles. At the rear of jack 20, the sheet metal of receptacle 18 extends beyond the body of jack 20 in the form of two lateral legs, on which soldering lugs 100 are provided, which are inserted in printed board 16 and soldered to its ground conductive strips. On the front end, the sheet metal of receptacle 18 has two springy tongues 102 expand when plugged into the plug-in opening, so that they rest under springy pressure against the shielding metal of plug 96 and thus make good contact with the shielding of the plug cable and connect it to receptacle 18 and thus to the shielding of the connector box. Tab 22 are cut out on the sides of receptacle 18 which are spread outwardly from receptacle 18. Tabs 22 thus make electrical contact under springy pressure with upper part 12 of the base and establish the connection between the shielding of the housing and the shielding of the plug. If two jacks 20 are provided in the connector box, tabs 22 of receptacles 19 of these two jacks 20 come into contact elastically with each other to establish good, conductive contact between the two receptacles 18 and upper base part 12.

An access hole in the outside contour of upper base part 12 exposes a strip of the edge of lower base part 10. In the area of this edge strip, printed board 16 projects out from under upper base part 12, so that it is exposed on the upper side of lower base part 10, outside the closed housing formed by lower base part 10 and upper base part 12. On this exposed edge strip of printed board 16, a multiple terminal connector 24 is placed, which in the exemplary embodiment shown, is designed as a screw terminal. The contacts of screw terminal connector 24 (8 contacts in the exemplary embodiment shown) are connected by the way of conductive strips on the printed board 16 to the contacts of jack 20.

The access hole in upper base part 12 above lower base part 10 and printed board 16, which holds terminal connector 24. The edge of cover 26 resting on rim 14 has an outward bulge 28 is covered by a cover 26, formed from a piece of sheet metal, the edges of which are bent at a right angle. The upper leg of cover 26 parallel to printed board 16 is hung on and snapped into the upper edge of upper base part 12, while the free edge of the other leg of cover 26 rests under slight spring pressure from the outside against rim 14 of lower base part 10. The two side pieces of cover 26 are in contact with projection side walls of upper base part 12. Cover 26 is thus in conductive contact with the housing and encloses and shield the space which holds terminal connector 24. The edge of cover 26 resting on rim 14 has an outward bulge 28, which allows the cable to be connected to pass through to terminal connector 24 in a manner to be described further below.

Figure 4:
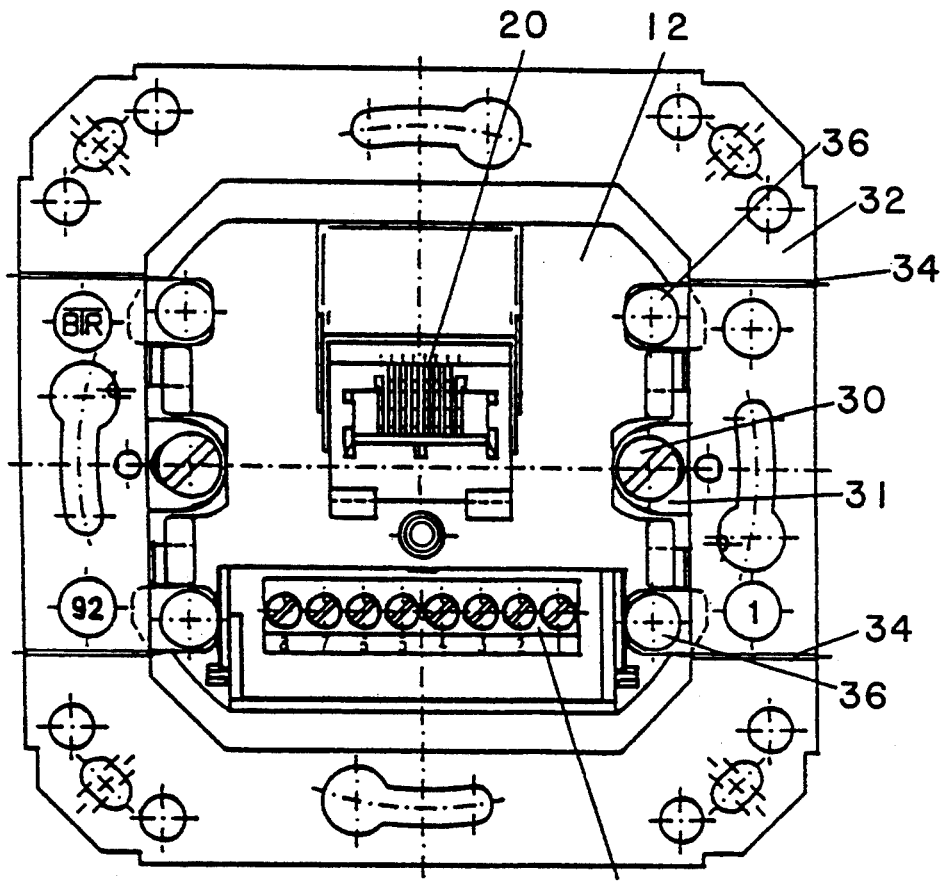
FIG. 4 shows a top view of the connector box without its protective cap.
Figure 5:
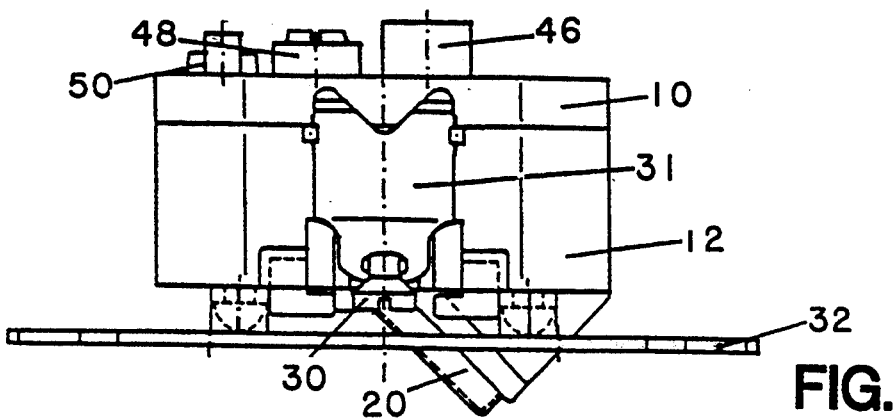
FIG. 5 shows a side view of the connector box in FIG. 1, from above, without the protective cap.
Figure 6:
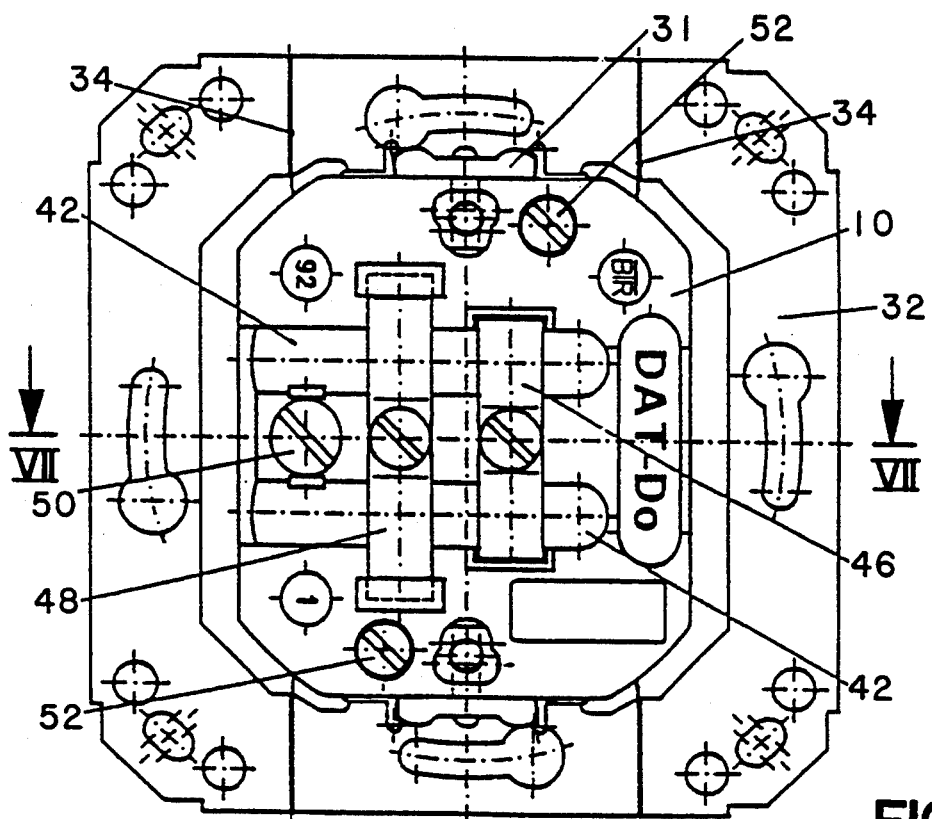
FIG. 6 shows a bottom view of the connector box.
Figure 7:
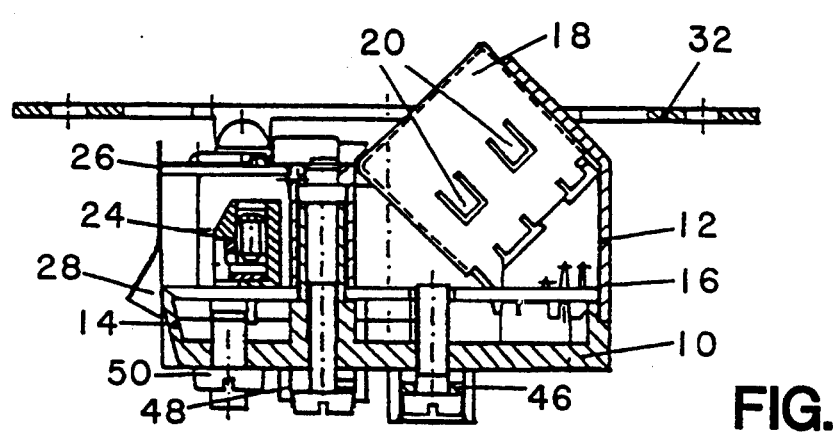
FIG. 7 shows a cross section along lines VII—VII of FIG. 6.

Claws 31, which can be spread apart by means of screws 30, are attached to upper base part 12 to allow installation in an empty, flush mount box. Arrows 36 are molded on the top of upper base part 12, onto which a mounting ring 32 is riveted. Mounting ring 32 surrounds the housing to form a flange-like element around the entire periphery. With this design of mounting ring 32, the connector box is suitable for installation in an empty, flush mount box. As shown in FIG. 4, mounting ring 32 has predetermined break lines 34, at which the two parts of mounting ring 32 next to jack 20 or those next to terminal connector 24 can be broken off. When these parts are broken off, only the two parts on either side of jack 20 or those on either side of terminal connector 24 remain behind. As a result, the connector box is suitable for installation in a conduit.

Figure 8:
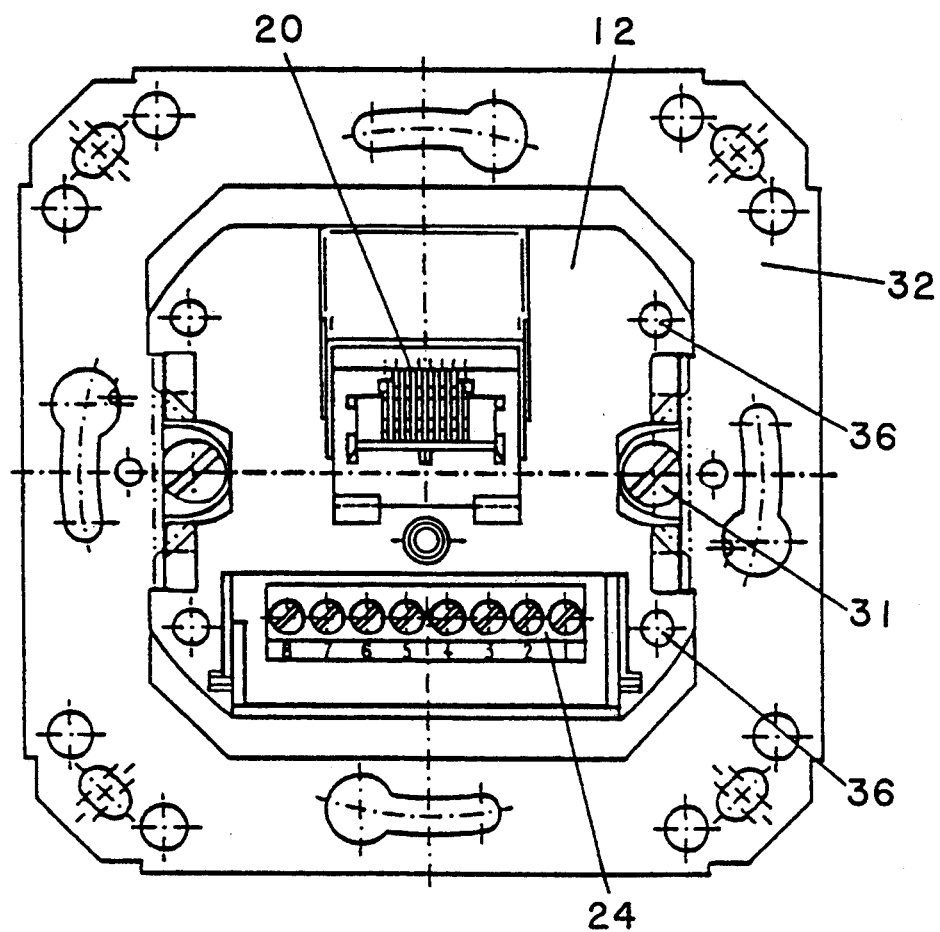
FIG. 8 shows a view, corresponding to that of FIG. 4, of a second embodiment of the connector box.
Figure 10:
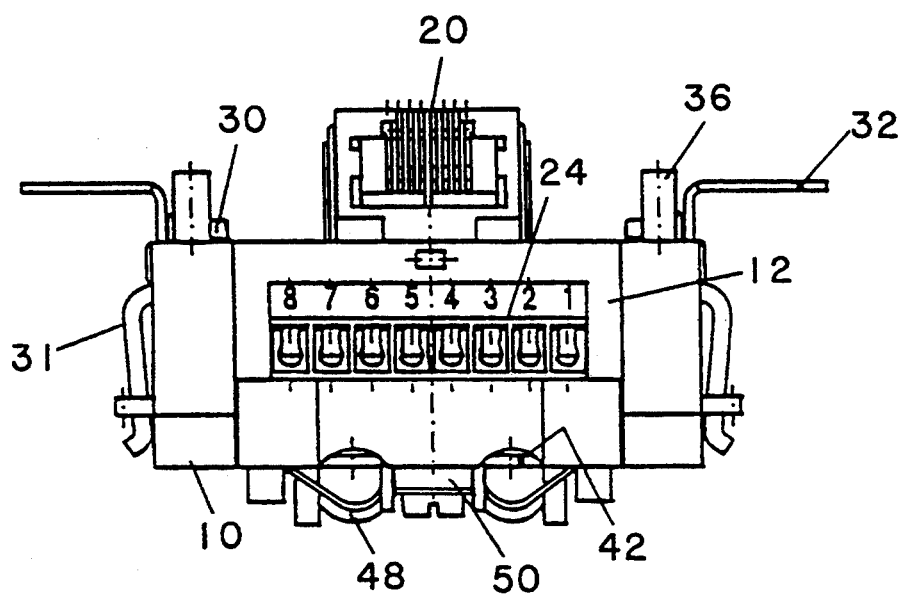
FIG. 10 shows a side view, corresponding to that of FIG. 3, of the connector box of FIG. 9.
Figure 9:
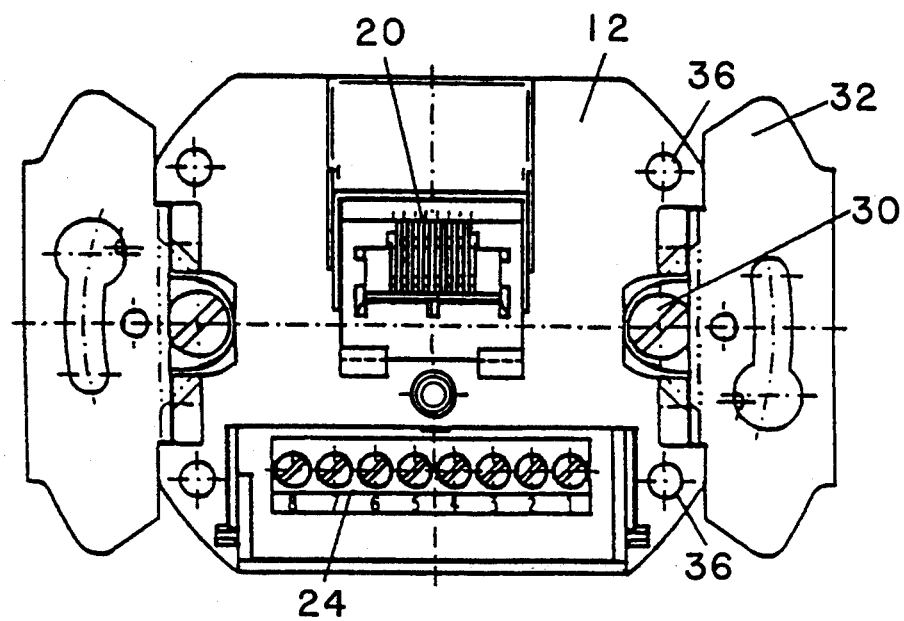
FIG. 9 shows a view, corresponding to that of FIG. 4, of a third embodiment of the connector box.

There is shown in FIG. 8 another embodiment in accordance with the present invention. In this embodiment, the mounting ring 32 does not have any predetermined break lines which means that it is suitable only for installation in an empty flush mount box. Another embodiment of mounting ring 32 is shown in FIGS. 9 and 10. In accordance with this form, segments of the mounting ring are provided only on either side of the jack 20 and terminal connector 24, and thus this design is especially suitable for installation in conduits. In all other respect the embodiments shown in FIGS. 8, 9 and 10 are the same as the embodiment shown in FIGS. 1–7 inclusive.

Mounting ring 32 is made in the conventional manner by stamping it out of sheet metal. In a modified form of this design, mounting ring 32 can also be made of plastic as in the embodiment shown in FIGS. 4, 8 and 9. The use of plastic for mounting ring 32 prevents the transmission of electrical interference from the building wall through mounting ring 32 to the housing formed by lower base part 10 and upper base part 12.

A protective cap 36 is placed on mounting ring 32. This cap is attached by means of a screw 40 to upper base part 12 and leaves only the plug-in opening of the jack 20 free.

Two receiving grooves 42 for an incoming and an outgoing cable 44 are provided on the bottom of lower base part 10. Receiving grooves 42 are crossed by a strain-relief strap 46 and a contact strap 48, each of which is attached to lower base part 10 by a screws 60, 66 respectively, between receiving grooves 42. Strain-relief strap 46 is a sturdy steel strap, whereas contact strap 48 is a springy metal strap.

Figure 11:
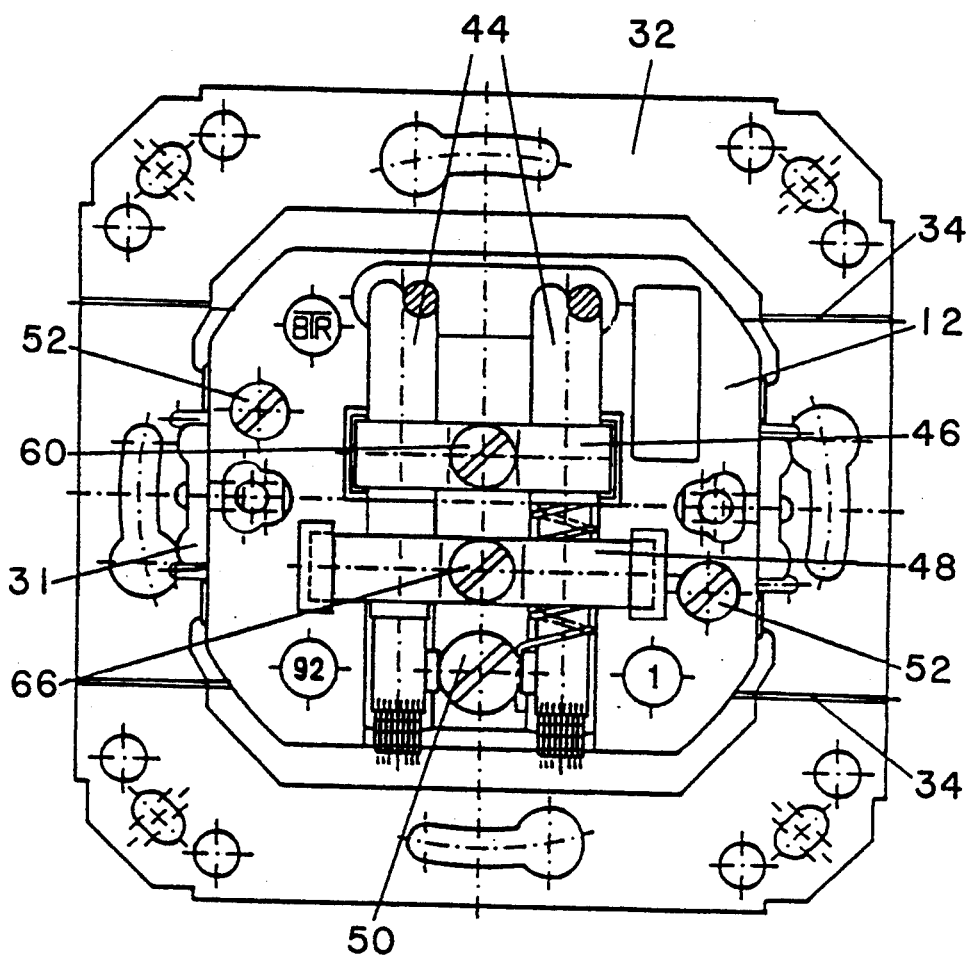
FIG. 11 shows a view, corresponding to that of FIG. 6, of a box with cables connected to it.
Figure 13:
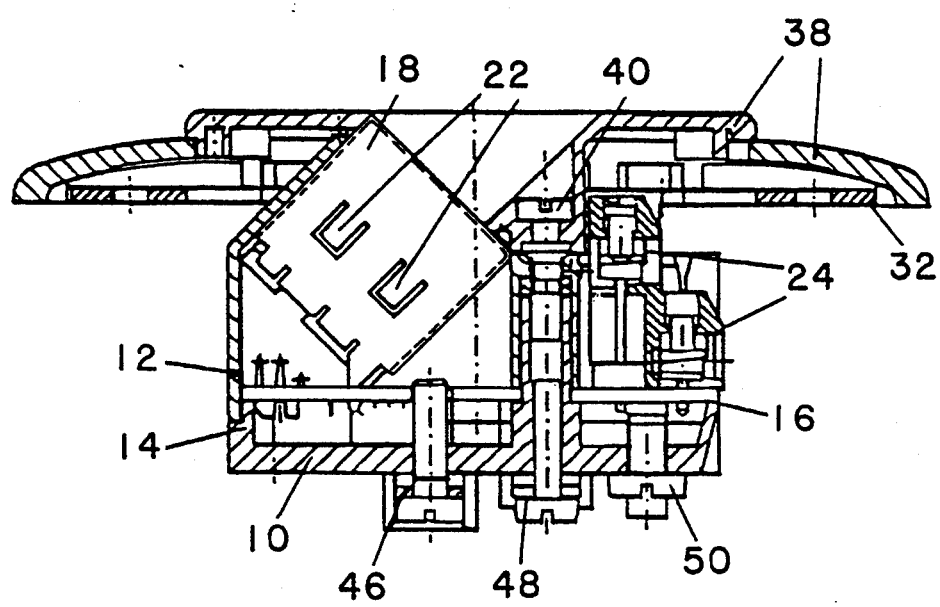
FIG. 13 shows a cross section along lines XIII—XIII of FIG. 12.
Figure 12:
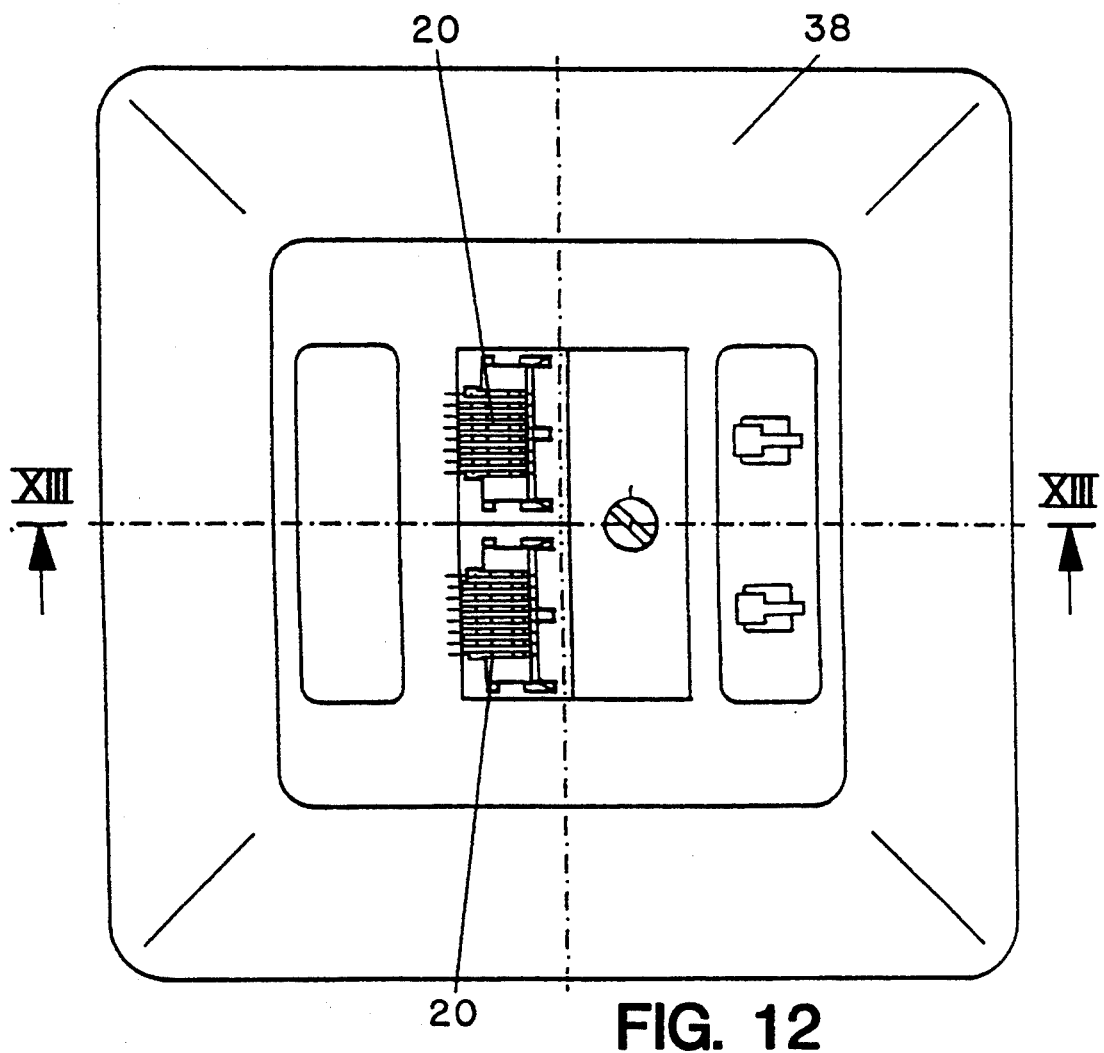
FIG. 12 shows a view, corresponding to that of FIG. 1, of a fourth embodiment of the connector box with two jacks.
Figure 14:
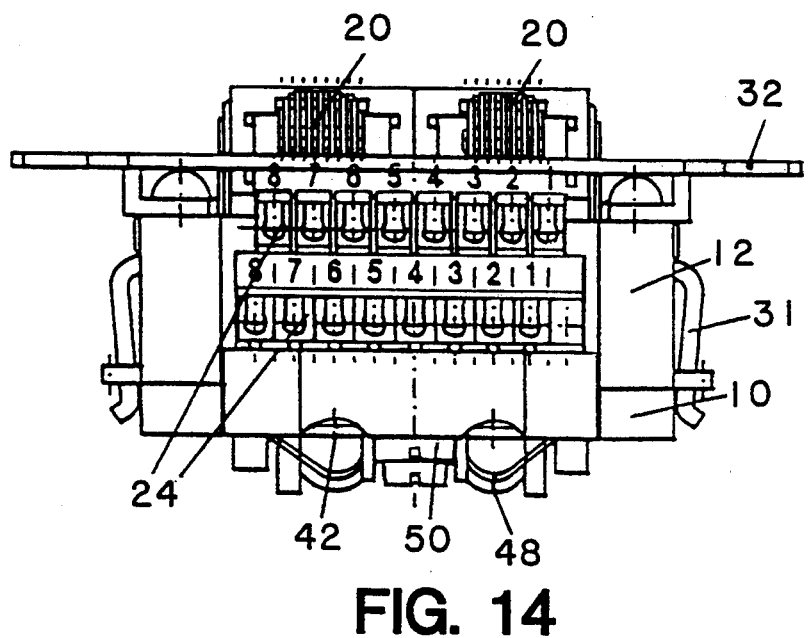
FIG. 14 shows a side view of the connector box in FIG. 12, from the right, without the protective cap.
Figure 15:
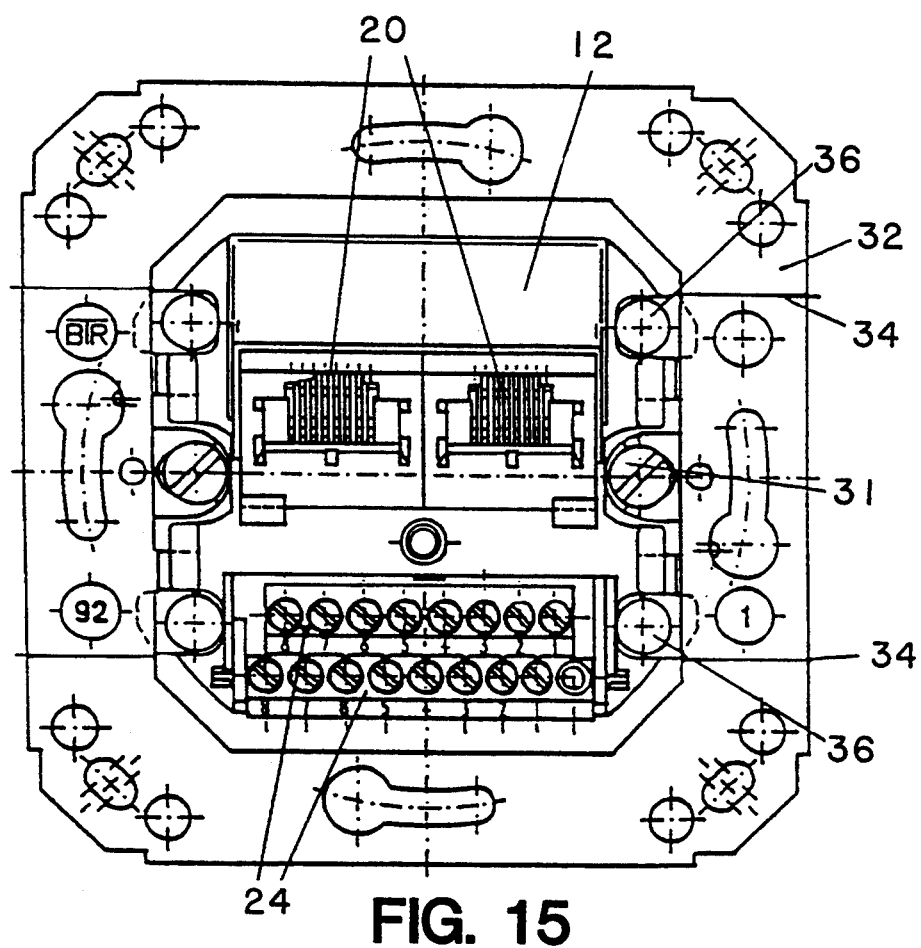
FIG. 15 shows a top view of the connector box of FIG. 12, without the protective cap.

It can be seen from FIG. 11 how cables 44 are attached. The outside insulation, the shielding, and the inside insulation are removed in stages from the ends of cables 44 to be attached. Cables 44 are then laid in receiving grooves 42. Strain-relief strap 46 rests on the outside insulation of cables 44 and clamps cables 44 down tightly onto lower base part 10 to relieve the tensile strain on them. Contact strap 48 rests on the adjoining area with the exposed shielding and establishes the electrically conductive connection between the shielding of cables 44 and lower base part 10. The springy properties of contact strap 48 ensure good and reliable contact between lower base part 10 and the shielding of cable 44, even if the shielding gives way as a result of the aging of the plastic of the inside insulation. Receiving grooves 42 are provided in the area of contact strap 48, which press into the shielding of cables 44 and ensure reliable contact. The contact strap 48 can be provided with transverse ribs for the same purpose. The shielding can consist of braided material, as shown in cable 44 on the left in FIG. 11, or of a vapor-deposited layer with an accessory wire, as shown on cable 44 on the right in FIG. 11. In the area adjoining contact strap 48, an setscrew 50 is screwed into lower base part 10. The head of setscrew 50 is seated between two guide tabs, projecting from the surface of lower base part 10, so that, by means of locking screw 50, the accessory wire of the cable shielding can be clamped firmly in place, as shown on the right in FIG. 11 for cable 44. Cables 44, from which the shielding has been removed, are guided around the edge of lower base part 10, so that the leads of cable 44 can be connected to terminal connector 24. After the leads have been connected to terminal connector 24, cover 26 is set in place, outward bulge 28 making it possible for cables 44 to pass through and between lower base part 10 and cover 26.

The leads of cables 44 are connected by way of terminal connector 24 and the conductive pathways of printed board 16 to the solder pins of jack 20 and thus to the contacts of jack 20.

The shielding of cables 44 is connected conductively by the pressure of contact strap 48 and by way of its screw 66 to lower base part 10. Lower base part 10 is connected in turn to printed board 16 and to upper base part 12. Receptacle 18 is also soldered by means of soldering lugs 100 to printed board 16. Finally, receptacle 18 is connected conductively by way of tabs 22 to upper base part 12 and by way of springy tongues 102 to the shielding of a plug 96, which is plugged into jack 20.

Figure 16:
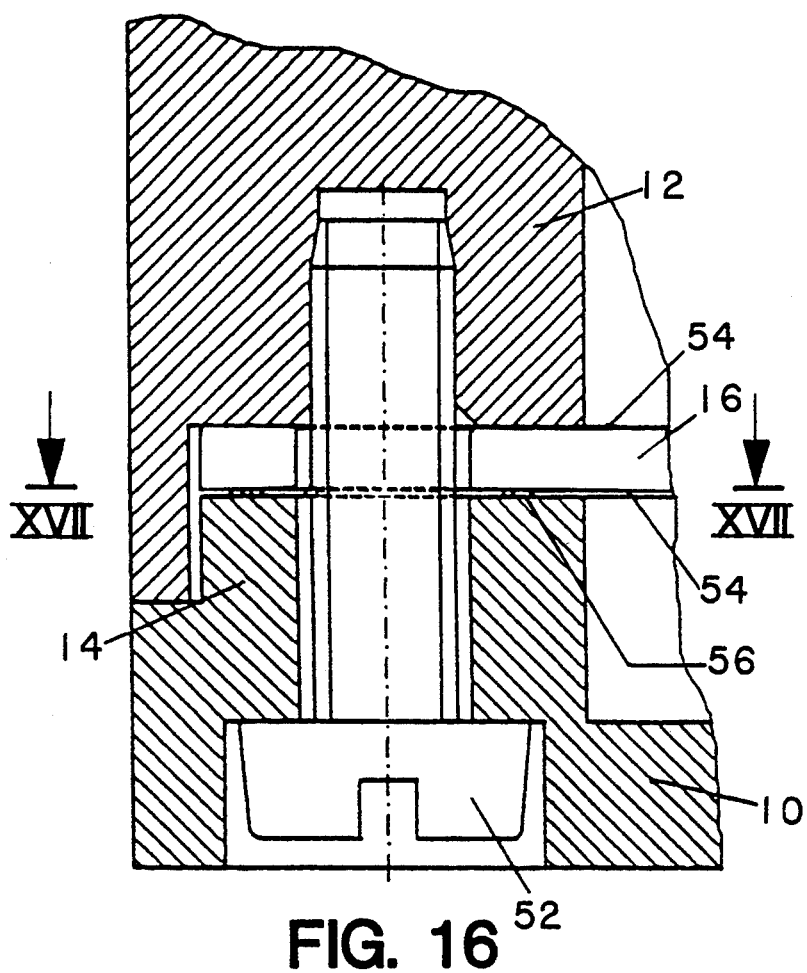
FIG. 16 shows, in cross section, a detail of the connection between the upper and lower parts of the base.
Figure 17:
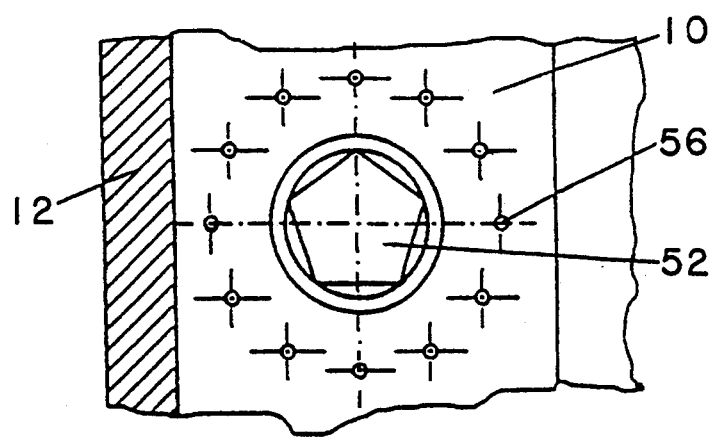
FIG. 17 shows a cross section along lines XVII—XVII in FIG. 16.

FIGS. 16 and 17 shown in detail how the electrically conductive connection between lower base part 10, upper base part 12, and printed board 16 is produced. Two diametrically opposing, self-tapping screws 52 are set into lower base part 10 near the periphery. Screws 52 pass through holes in printed board 16, which is held between lower base part 10 and upper base part 12. Screws 52 are turned by their self-tapping shafts into upper base part 12. Socket-head cap screws 52 thus clamp lower base part 10. Furthermore, good electrical contact is established between upper base part 12 and screws 52 by the threads of screws 52, which have dug themselves into upper base part 12. This conductive pathway is continued by the socket head of screws 52 to lower base part 10. Printed board 16 is clamped under pressure between lower base part 10 and upper base part 12, so that good electrical contact is produced both between lower base part 10 and lower copper lamination 54 of printed board 16 and between upper base part 12 and upper copper lamination 54. To improve the contact, spikes 56 are formed around the holes for screws 52 on the surface of lower base part 10 on which printed board 16 rests. These spikes penetrate into copper lamination 54 on printed board 16 and ensure optimum conductive contact between lower base part 10 and printed board 16.

The connector box thus results in a continuous, electrically conductive connection between the shielding of cables 44 and the shielding of a cable which is connected by engaging plug 96 into jack 20. This electrically conductive connection leads from the shielding of cable 44 to lower base part 10 by way of the contact with lower base part 10 and contact strap 48; from lower base part 10, it leads by way of the contact surface to copper lamination 54 of printed board 16, especially by way of spikes 56, and then, from this copper lamination 54 by way of soldering lugs 100, 22 to the shielding of the cable plug. By means of this conductive connection of the shielding, the characteristic impedance of the connection from cable 44 to the cable plugged into the connector box can be reduced to significantly less than 250 mΩ.

Furthermore, because of the closed metal housing consisting of lower base part 10 and upper base part 12, which are seated on each other without any gaps, and because of cover 26, a completely enclosed shielding of the connector box is obtained, so that even high frequencies of about 20 MHz can be transmitted with out interference, as occur at data transmission at baud rates of about16 Mbit/s.

FIGS. 12–15 shown a similar connector box with two jacks 20. The structure of the connector box is the same as that of the exemplary embodiment shown in FIGS. 1–7, so that reference can be made to the description provided there. The only terminal connectors, mounted one above the other like steps, are provided, one for each of the two jacks 20.

FIGS. 18–23 shown another exemplary embodiment of the connector box. Unless described otherwise below, this box is the same as the preceding exemplary embodiments, and the same reference numbers are used.

Figure 19:
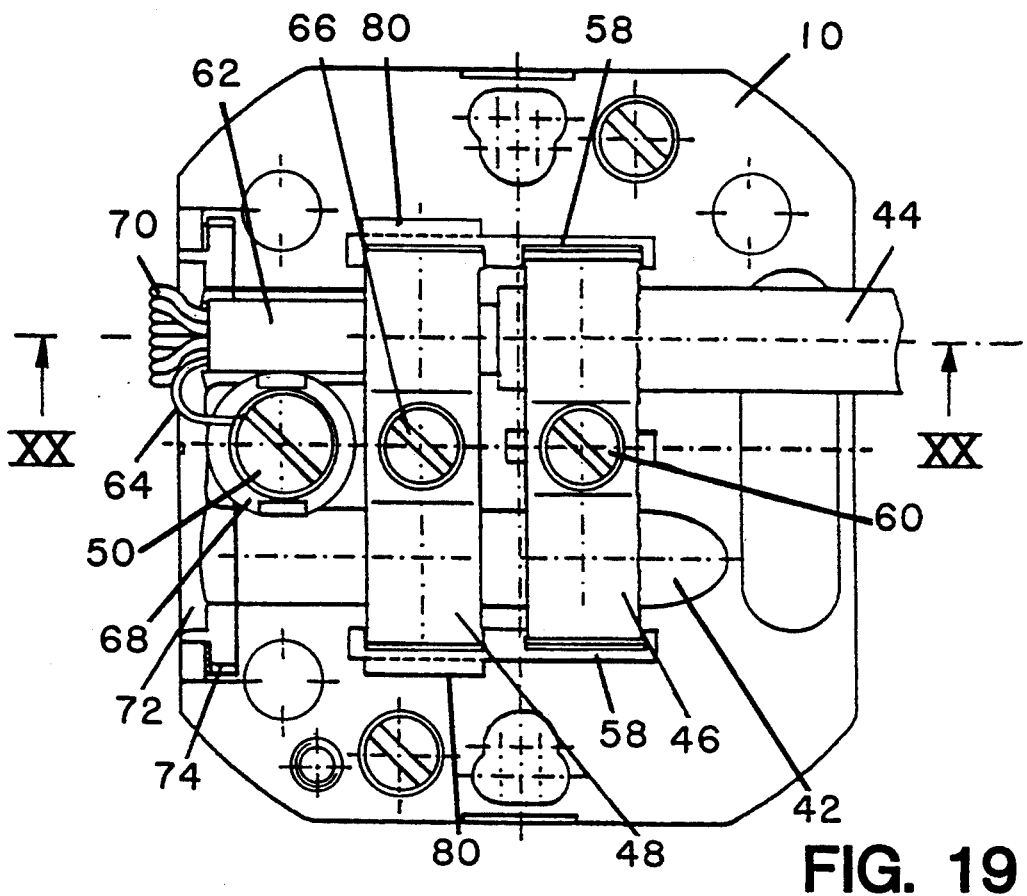
FIG. 19 shows a bottom view of the connector box of FIG. 18.
Figure 20:
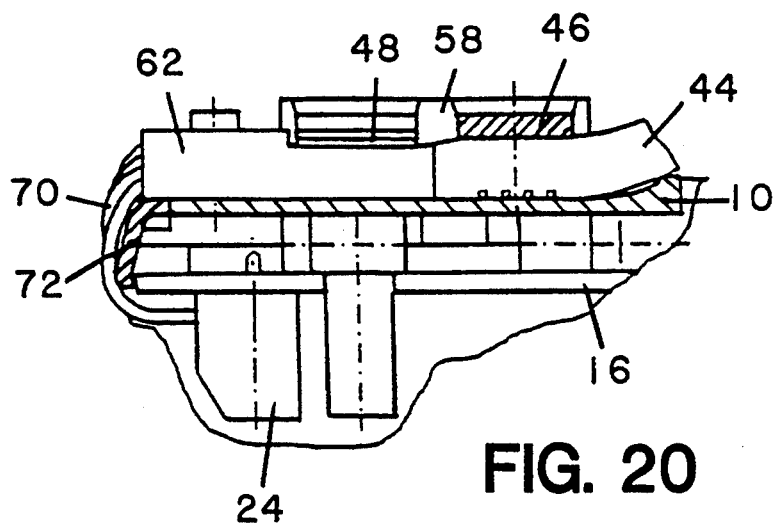
FIG. 20 shows a partial cross section through the lower part of the base of the connector box along lines XX—XX of FIG. 19.
Figure 21:
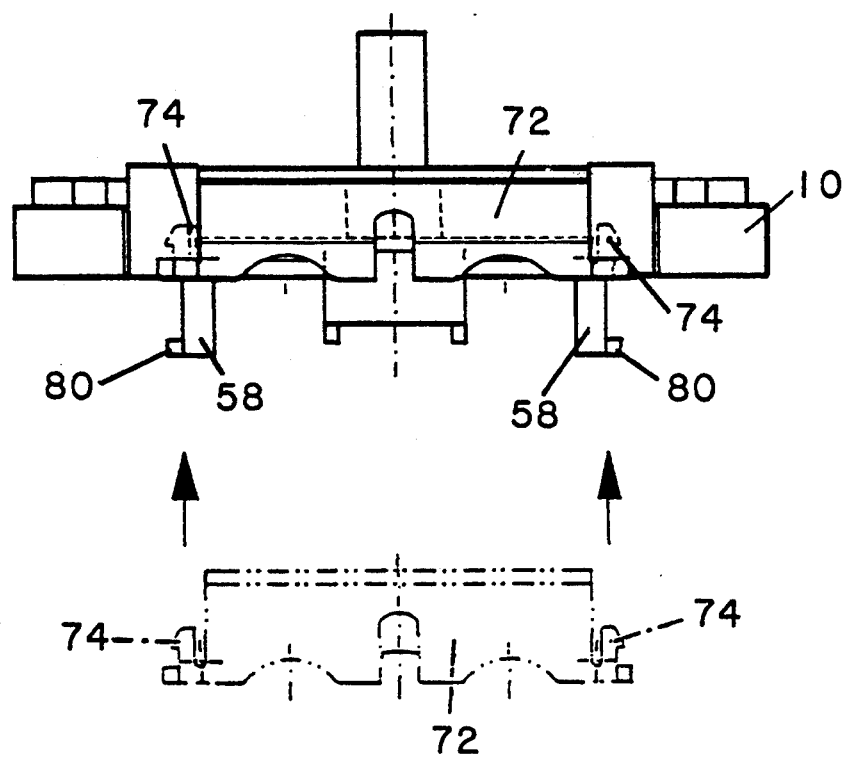
FIG. 21 shows a front view of the lower part of the base of the fifth embodiment.

As FIGS. 19 shows, the two receiving grooves 42 for an incoming and an outgoing cable 44 are provided on the bottom of lower base part 10. Cables 44 are laid in receiving grooves 42 and can be clamped firmly in place by strain relief strap 46. Strain-relief strap 46 is a sturdy steel strap and is guided between two guide straps 58 in such a way that it would be tightened against lower base part 10 by means of a screw 60, which engages in lower base part 10. Guide strips 58 are molded on lower base part 10 and project from its bottom side. Strain-relief strap 46 extends over both receiving grooves 42 and any cables 44 which may be laid in these grooves. Strain-relief strap 46 rests on the outside insulation of cables 44 to clamp them mechanically in place.

FIG. 19 shows how a cable 44 is connected. The cable has braided wire 62 with an accessory ground wire 64 as shielding. The outside insulation of cable 44 is removed up as far as strain-relief strap 46. In front of strain-relief strap 46, contact strap 48 is mounted in additional guides of guide strips 58. Contact strap 48 is a springy metal strap, which also extends over both receiving grooves 42, is seated on braided wire 62 of the shielding of cable 44, and presses wire braid 62 of the shielding under its springy pressure against lower base part 10. Contact strap 48 is held and tensioned by screw 66, which screw into lower base part 10.

In front of contact strap 48, setscrew 50 is provided between receiving grooves 42. This screw can be screwed into an elevation 68 on lower base part 10. By means of setscrew 50, accessory ground wire 64 of the shielding of cable 44 is held firmly in conductive contact with lower base part 10.

The core leads 70 of cables 44 are guided around the edge of lower base part 10 and to terminal connector 24 seated on printed board 16. A protective strip 72 made of an insulating plastic is attached to the edge of lower base part 10 around which the core leads 70 are bent. The protective strip extends across a part of the width of the edge of lower base part 10 where the core leads 70 are located. Protective strip 72 has curved depressions adjoining receiving grooves 42. These depressions guide the core leads 70 around the side. As is especially clear in FIG. 21, protective strip 72 has spring hooks 74 on both sides, by means of which it can be snapped into latching projections on lower base part 10. The protective strip 72 prevents conductive contact form becoming established between core leads 70 and lower base part 10 in the event of damage to the insulation of core leads 70 at the bending point as a result of, for example, brittle fracture of the plastic insulation.

Figure 18:
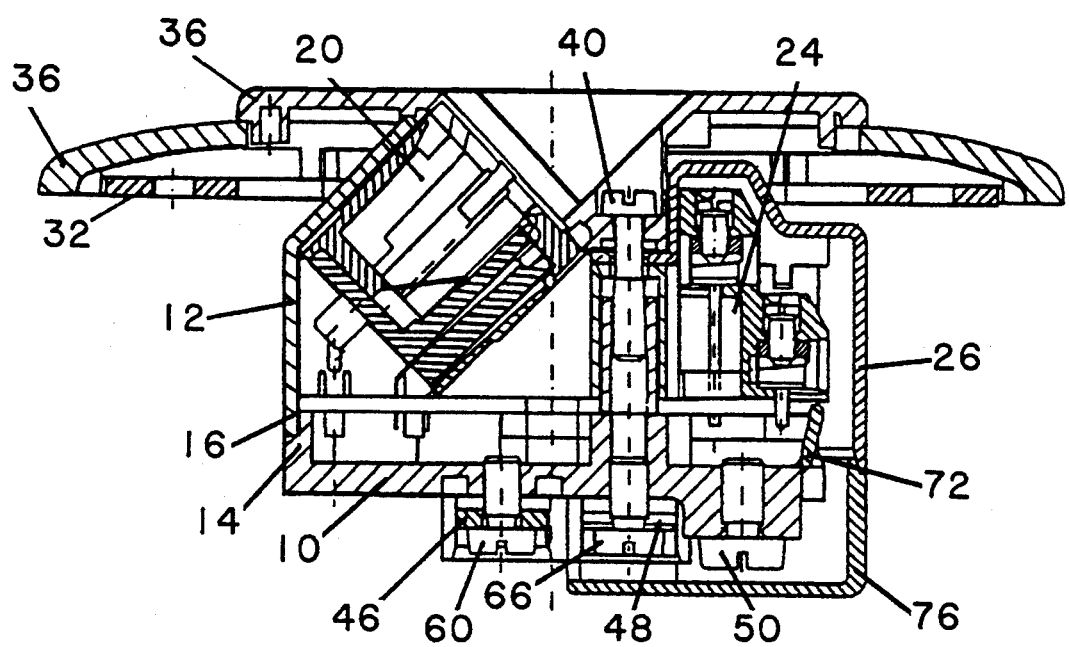
FIG. 18 shows a cross section, corresponding to that of FIG. 2, of a fifth embodiment of the connector box.
Figure 22:
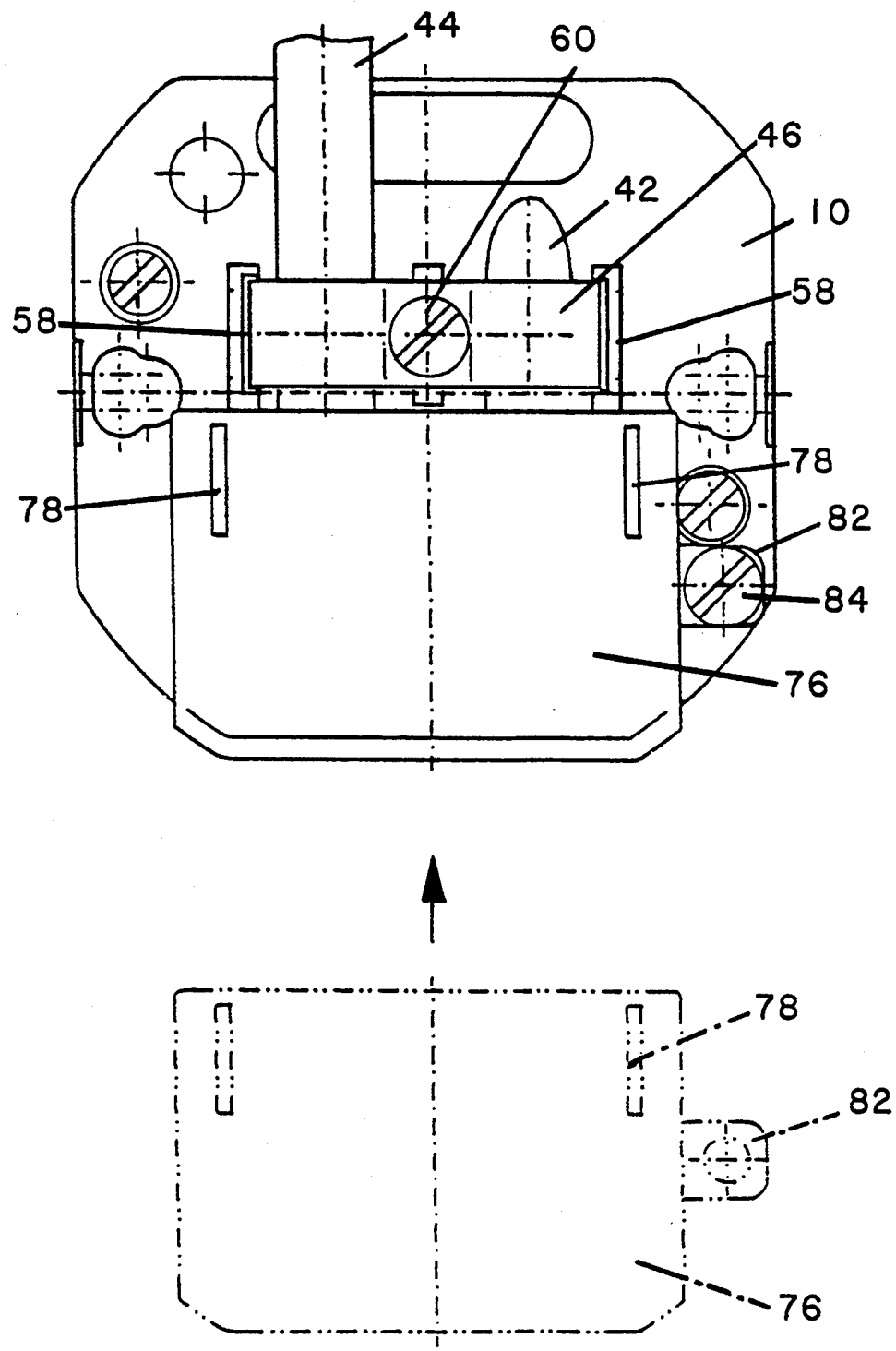
FIG. 22 shows a bottom view of the fifth embodiment of the connector box, with the bottom shielding.
Figure 23:
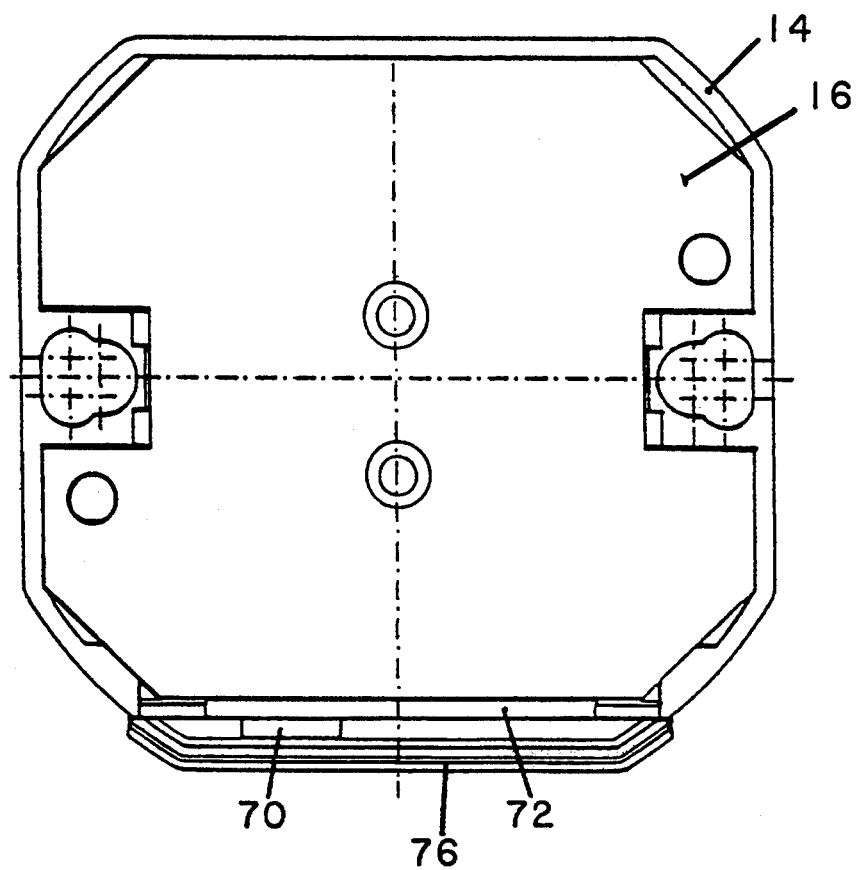
FIG. 23 shows a top view of the bottom part of the base, with the printed board.
Figure 24:
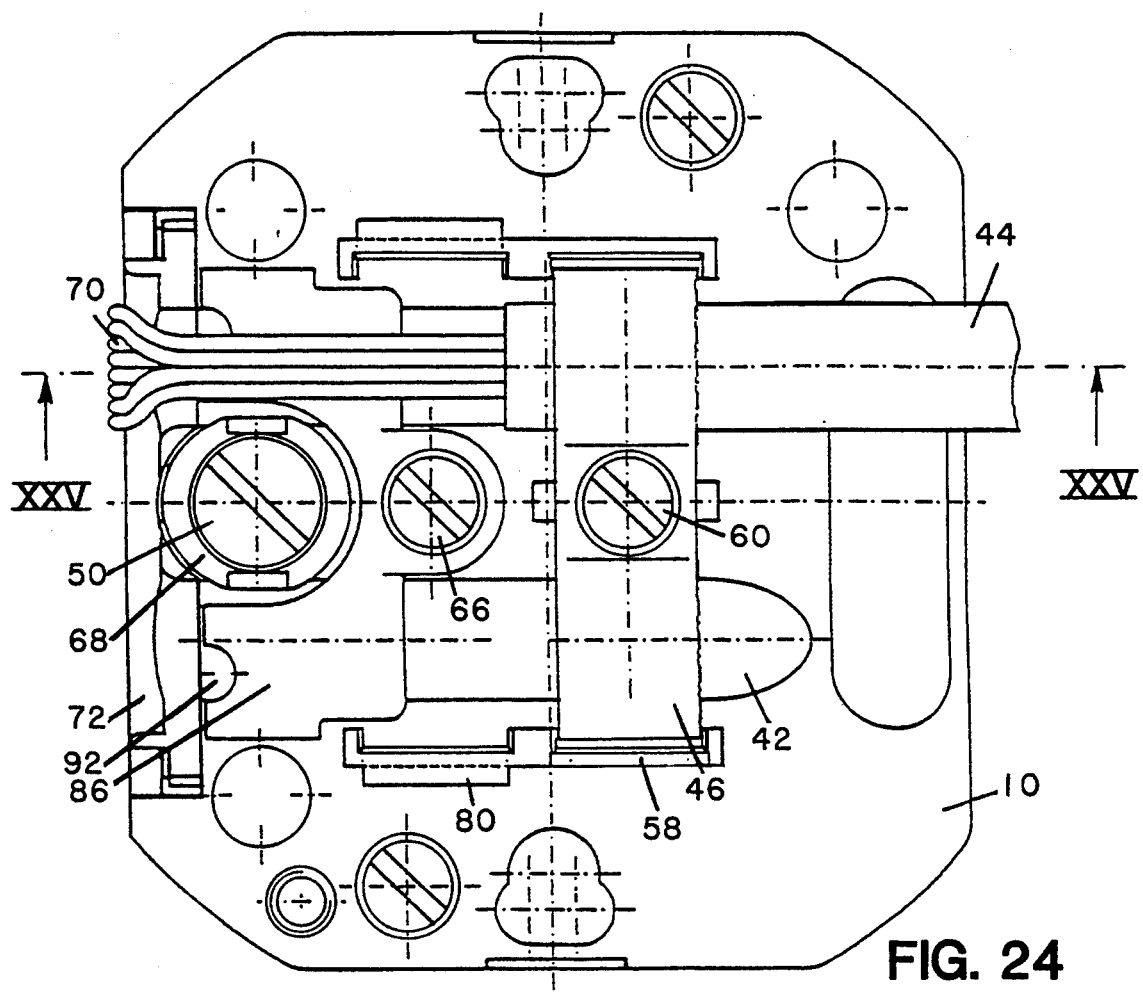
FIG. 24 shows a bottom view of a sixth embodiment of the connector box with a modified method of providing contact for the cable shielding.
Figure 25:
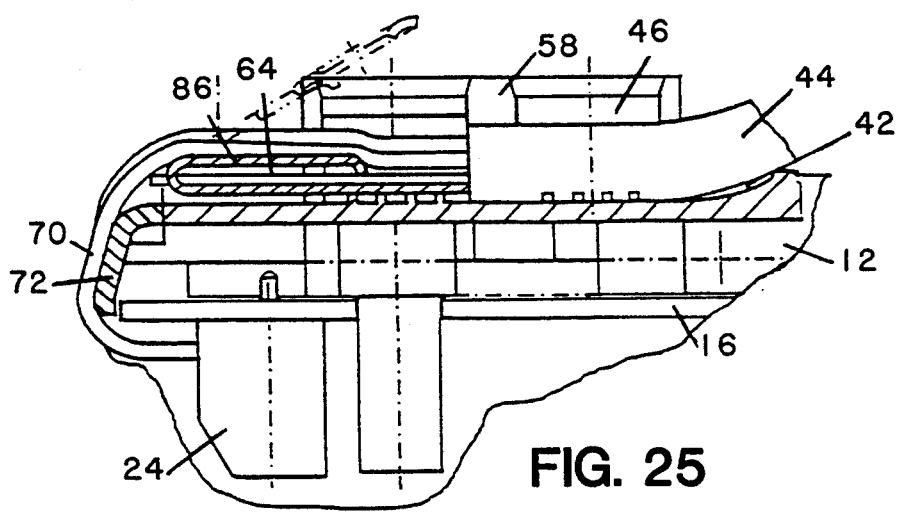
FIG. 25 shows a partial cross section through the lower part of the base alone lines XXV—XXV of FIG. 24.
Figure 28:
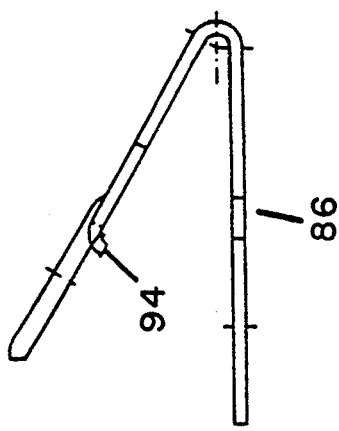
FIG. 28 shows a side view of the shielding contact part.
Figure 26:
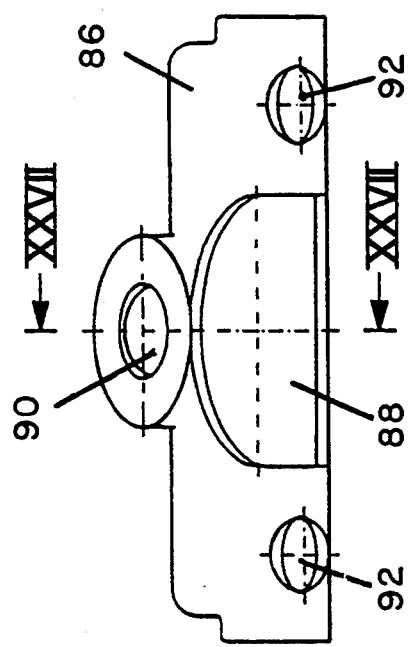
FIG. 26 shows a front view of a shielding contact part used in this contacting method.
Figure 27:
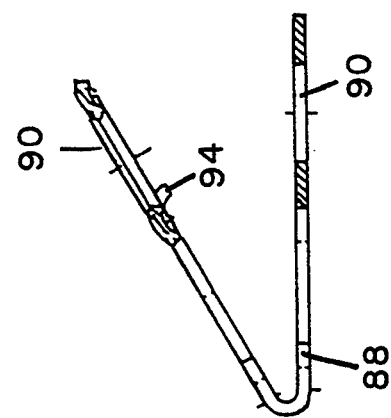
FIG. 27 shows a cross section through the shielding contact part along lines XXVII—XXVII of FIG. 26.

To shield core leads 70 of cables 44 from interference in the area where the cable insulation has been removed, a bottom shield 76 of metal, preferably of die-cast zinc, is provided additionally. Bottom shield 76 has the form of flat plate, parallel to the bottom side of lower base part 10. The edges of this plate are bent up at an angle so that the plate can be seated on the bottom of lower base part 10. Starting from the end of cables 44, bottom shield 76 is pushed parallel to lower base part 10 over the insulated ends of the cables. Projections 78 formed on the inside surface of bottom shield 76 engage externally with projections 80 formed on guide strip 58 to hold bottom shield 76 firmly in place on lower base part 10. A bracket 82, molded on the side of bottom shield 76, is screwed by means of a screw 84 to lower base part 10 to ensure good conductive contact between bottom shield 76 and lower base part 10. Bottom shield 76 extends at its forward edge (as seen in the insertion direction) up as far as strain-relief strap 46, as can be seen in FIG. 22. At its rear edge (with respect to the insertion direction), shield 76 is bent at an angle and engages the edge of lower base part 10 provided with protective strip 72, so that core leads 70 guided around this edge are also shielded. (See FIG. 23.) As can be seen in FIG. 18, cover 26 is also made of die-cast zinc in this embodiment. Cover 26 extends downward in front of the edge of lower base part 10, and is seated, overlapping like steps, on the upward extending edge of bottom shield 76. Bottom shield 76 thus cooperates with cover 26 to ensure that core leads 70 of the cables 44 are completely shielded all the way from attachment of cable 44 by strain-relief strap 46 to the connection of core leads 70 to terminal 24.

FIGS. 24–28 shown a sixth design with a modification of the electrical contact connection between the shielding of cable 44 and the hosing consisting of lower base part 10 and upper base part 12.

With respect to the attachment of cable 44 to lower base part 10, different capacitances can occur between insulation wire braid 62 of cable 44 and lower base part 10. These capacitances affect the high-frequency behavior. For this reason, wire braid 62 is removed from the end of the cable also, as well as the outside insulation, so that wire braid 62 of the shielding does not project beyond the outside insulation of the cable, which is clamped in place by strain-relief strap 46. Only accessory ground wire 64 of the shielding of cable 44, along with core leads 70, is allowed to extend out beyond outside insulation.

Instead of contact strap 48, a shielding contact part 86 is attached to the bottom of lower base part 10. The contact part is shown in detail in FIGS. 26–28. Shielding contact part 86 is designed as a part stamped out of sheet metal, which is bent around a square edge, so that it has two legs that form an angle of 30° with respect to each other. In the center, near the bend, a cutout 88 is provided, so that setscrew 50 and the associated elevation 68 of lower base part 10 do not interfere with the installation of shielding contact part 86. At the free ends of the legs of shielding contact part 86, which are open toward the strain-relief strap 46, holes 90 are provided, one in the center of each leg, in which a screw 66 can be inserted. On both sides of cutout 88, openings 92 are provided near the edge of the bend of shielding contact part 86. At its free end, the upper leg of shielding contact part 86 has edges 94 on both sided as hole 90; these edge sections are bent toward the lower leg.

When cable 44 is connected, shielding contact part 86 is first laid on lower base part 10 and attached loosely to lower base part 10 by means of screw 66 passing through holes 90. The end of cable 44 is freed of its outside insulation and of an equal length of wire braids 62, so that only core leads 70 and accessory ground wire 64 of the shielding project out from the end of the cable. Cable 44 is laid in receiving groove 42 and first attached loosely by means of strain-relief strap 46. Then accessory ground wire 64 is passed through the legs of shielding contact part 86 and then through opening 92. Core leads 70 in this situation are situated above the upper leg of shielding contact part 86. Now, by pulling on accessory ground wire 64, cable 44 is pulled against shielding contact part 86 until the outside insulation of cable 44 comes to rest against shielding contact part 86. Now, while accessory ground wire 64 is held under tension, screw 66 of the shielding contact part 86 and screw 60 of strain-relief strap 46 are tightened. As a result, cable 44 is held in place by strain-relief strap 46, and at the same time accessory ground wire 64 is held in place between the legs of shielding contact part 86 and reliably contacted by edge 94. Then core leads 70 are connected to terminal connector 24. In this way, shielding contact part 86 beings about a conductive connection of precisely defined geometry between the shielding of cable 44 and lower base part 10 and thus the housing of the connector box. Because the geometric conditions between accessory ground wire 64 and lower base part 10 are precisely defined high frequency behavior.

Figure 30:
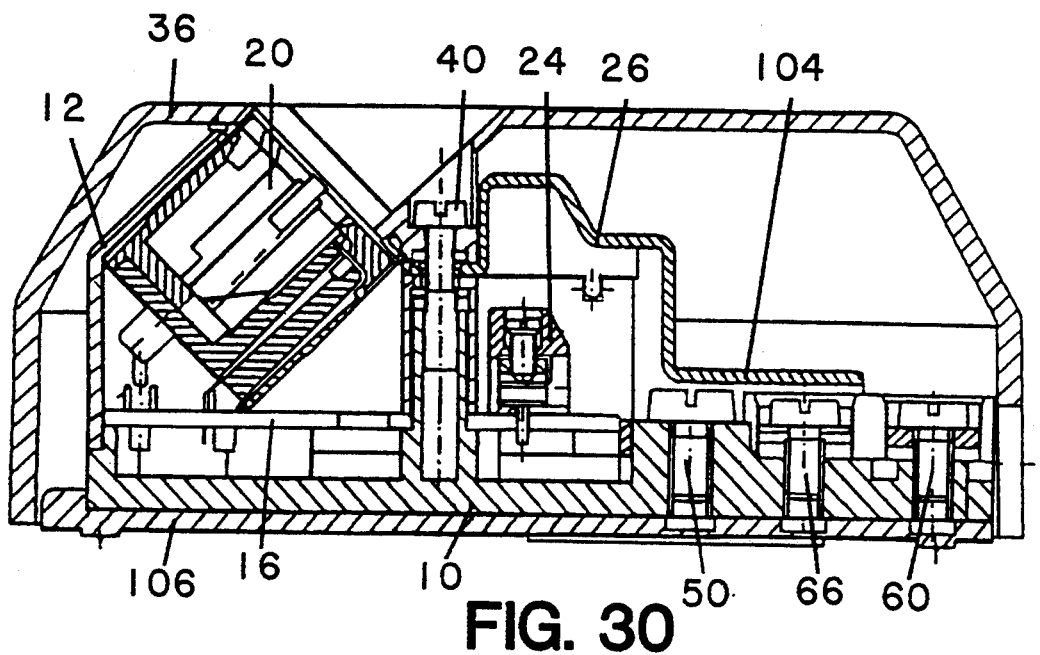
FIG. 30 shows a cross section, corresponding to that of FIG. 2, of a seventh embodiment of the connector box.
Figure 31:
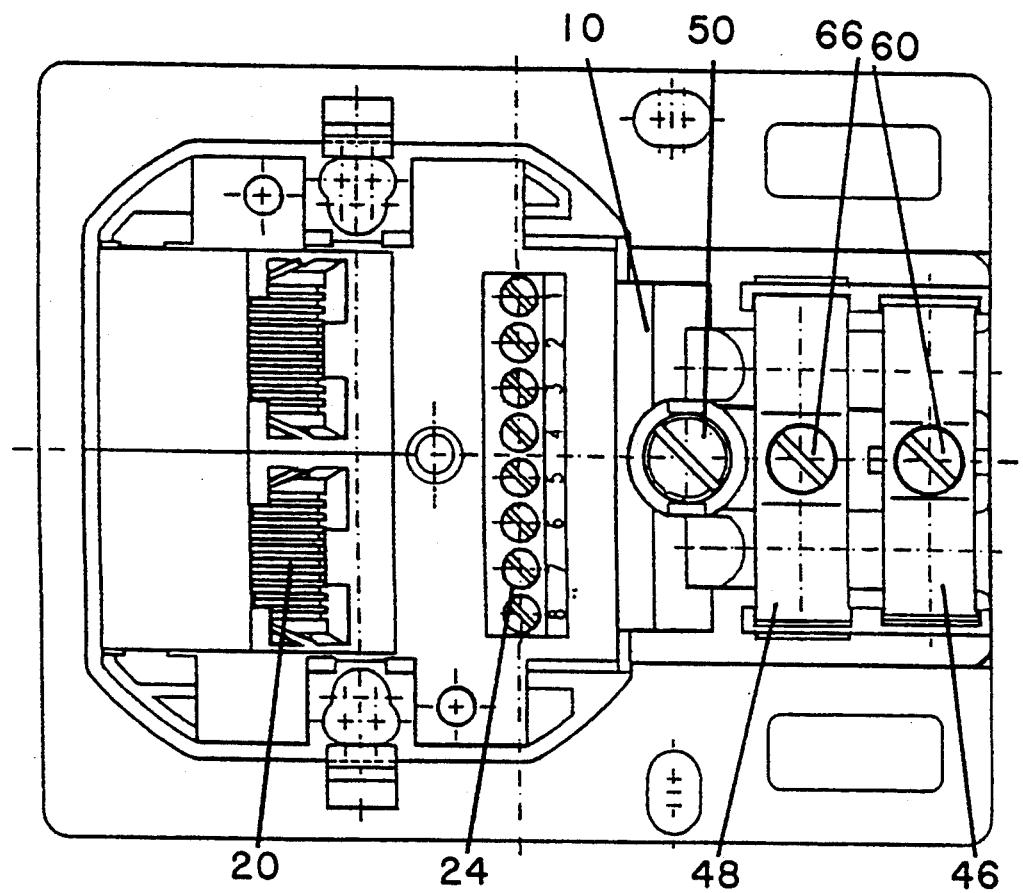
FIG. 31 shows a top view of the connector box of FIG. 30, without its protective cap.

FIGS. 30 and 31 show a seventh exemplary embodiment of the connector box, in which the connector box is designed as a surface-mounted box.

In this embodiment, the plate of lower base part 10 extends out beyond terminal connector 24. Receiving grooves 42 with strain relief strap 46, contact strap 48, and setscrew 50 are provided on the top of this extension of lower base part 10. Otherwise, these devices for connecting and clamping the cables are identical in design to those described in detail for the fifth exemplary embodiment shown in FIGS. 18-23. Reference can therefore be made to the description of this fifth exemplary embodiment.

Because the cable leads in this design do not have to be passed around the edge of lower base part 10 but can rather be guided along a flat plane to terminal connector 24, it is easier to provide terminal connector 24 and the exposed core leads with effective shielding. The downward directed edge of cover 26 is bent at a right angle and extends with its extension 104, which is parallel to lower base part 10, over setscrew 50 and contact strap 48. Extension 104 therefore corresponds in terms of its function to bottom shielding 76 of the fifth exemplary embodiment.

The complete, shielded connector box can be attached to a wall by means of a mounting plate 106.

Even though particular embodiments of the present invention have been illustrated and described wherein, it is not intended to limit the invention and changes and modification may be made therein within the scope of the following claims.

What is claimed is:

1. A connector box for at least one shielded cable comprising:
   upper and lower base parts;
   a printed board held between said upper and lower base parts;
   at least one jack and a terminal connector mounted on said printed board and connected to each other conductively by way of said board, characterized in that said lower base part and said upper base part form a housing and are die cast metal parts, and wherein said upper base part is seated by its peripheral edge on said lower base part in an electrically conductive manner;
   said housing enclosing and shielding at least said jack and a predetermined portion of said printed board;
   at least one cable having shielding and an unshielded end;
   and means for holding said shielding of said at least one cable in electrically conductive contact with at least one of said base parts.

2. The connector box according to claim 1, wherein said terminal connector is situated outside said upper base part on said printed board; and
   an electrically conductive cover in electrically conductive contact with at least one of said base parts, said electrically conductive cover covers and shields said terminal connector.

3. The connector box according to claim 2, further including additional shielding of metal on said lower base part which covers said unshielded end of said at least one cable held in place on said lower base part and which is in electrically conductive contact with said at least one of said base parts, said additional shielding either forms an integral part of, or is in contact with, said electrically conductive cover so that shielding is continuous from said cable shielding to said terminal connector.

4. The connector box according to claim 1, wherein said upper and lower base parts overlap at their contacting peripheries to define a stepped contact joint.

5. The connector box according to claim 1, wherein at least one said jack is surrounded by a receptacle of electrically conductive material soldered to the printed board, said jack having four side walls and a plug-in opening at one end for receiving a plug with a shielding plate.

6. The connector box according to claim 5, wherein said receptacle encloses said jack at least on said four side walls and on the one end of said jack having said plug-in opening, said receptacle having at least one springy tongue which engages in said plug-in opening of said jack;
   said at least one springy tongue contacting said shielding plate of said plug as it is plugged into said plug-in opening; and
   at least one tab on at least one side of said receptacle extending outwardly from said receptacle so that it makes springy contact with said upper base part.

7. The connector box according to claim 5, wherein said receptacle encloses said jack at least on said four side walls and on the one end of said jack having said plug-in opening, said receptacle having at least one springy tongue which engages in said plug-in opening of said jack;
   said at least one springy tongue contacting said shielding plate of said plug when said plug is plugged into said plug-in opening; and
   at least one tab on at least one side of said receptacle extending outwardly from said receptacle so that it makes springy contact with a springy plug tongue of said plug to be connected.

8. The connector box according to claim 1, wherein said lower base part and said upper base part are connected to each other and held together under tension by self-tapping screws.

9. The connector box according to claim 1, wherein said printed board further includes a conductive lamination on at least one side thereof, and said printed board is clamped between said lower base part and said upper base part in such a way that said conductive lamination is held under pressure in conductive contact with at least one of said base parts, and said at least one of said base parts having spikes which penetrate into said conductive lamination of said printed board.

10. The connector box according to claim 1, further including a contact strap made of springy metal attached by means of an electrically conductive screw to said lower base part;
   said contact strap extending over the shielding of said at least one cable proximate said unshielded end and pressing said shielding against said lower base part.

11. The connector box according to claim 1, wherein said at least one cable has external insulation, the connector box further including a strain-relief strap on said lower base part which extends over said at least one cable at the external insulation and holds said at least one cable firmly against said lower base part.

12. The connector box according to claim 11, further including a set screw for an accessory ground wire of said shielding of said at least one cable on said lower base part.

13. The connector box according to claim 1, further including a non-conductive cover proximate the peripheral edge of said upper base part, wherein said at least one cable is held in place on the bottom of said lower base part, said at least one cable having core leads which are guided around said lower base part whereby said non-conductive cover prevents a contact of said core leads with the edge of said lower base part.

14. The connector box according to claim 1, further including additional shielding of metal on said lower base part which covers said unshielded end of said at least one cable held in place on said lower base part and which is in electrically conductive contact with at least one of said base parts.

15. The connector box according to claim 1, further including a shielding contact part made of metal in electrically conductive contact on said lower base part;

wherein said at least one cable has external insulation and an accessory ground wire extending beyond said external insulation; and whereby the accessory ground wire held in place on said lower base part can be inserted into said shielding contact part and clamped in place there, said shielding contact part being a part stamped out of sheet metal which can be affixed to said lower base part and which has two legs, whereby the accessory ground wire can be clamped between said two legs.

* * * * *